United States Patent
Mo et al.

(10) Patent No.: US 8,791,857 B2
(45) Date of Patent: Jul. 29, 2014

(54) SYSTEM AND METHOD FOR INDOOR LOCATION TRACKING USING PSEUDO GPS SIGNAL TRANSMITTER

(75) Inventors: Sang Hyun Mo, Daejeon (KR); Heyung Sub Lee, Daejeon (KR); Jae Heum Lee, Daejeon (KR); Seung-Il Myong, Daejeon (KR); Hoe-Sung Yang, Daejeon (KR); Kang Bok Lee, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 252 days.

(21) Appl. No.: 13/253,580

(22) Filed: Oct. 5, 2011

(65) Prior Publication Data
US 2012/0086599 A1  Apr. 12, 2012

(30) Foreign Application Priority Data

Oct. 6, 2010 (KR) .................. 10-2010-0097506
Jun. 14, 2011 (KR) .................. 10-2011-0057661

(51) Int. Cl.
*G01S 19/11* (2010.01)
(52) U.S. Cl.
USPC .................................................. 342/357.48
(58) Field of Classification Search
CPC ....................................................... G01S 19/11
USPC ........................................................ 342/357.48
See application file for complete search history.

(56) References Cited

U.S. PATENT DOCUMENTS

| 6,771,625 B1* | 8/2004 | Beal ............................ 370/336 |
| 2002/0094821 A1 | 7/2002 | Kennedy, Jr. |
| 2009/0002230 A1 | 1/2009 | Kee et al. |
| 2010/0176989 A1 | 7/2010 | Kim |
| 2012/0286992 A1* | 11/2012 | Tekin et al. ............... 342/357.48 |

FOREIGN PATENT DOCUMENTS

| KR | 2001-0097597 | 11/2001 |
| KR | 10-2010-0021325 | 2/2010 |
| KR | 10-2010-0082462 | 7/2010 |

* cited by examiner

*Primary Examiner* — Harry Liu
(74) *Attorney, Agent, or Firm* — Staas & Halsey LLP

(57) ABSTRACT

To track the location of a terminal in an indoor space by using a pseudo GPS signal transmitter, a GPS signal sent from an artificial satellite is received, and a clock signal of the artificial satellite is extracted from the received GPS signal to perform synchronization with the artificial satellite. Once synchronization with the artificial satellite is performed, a pseudo GPS signal is generated, and the transmission time of the pseudo GPS signal is controlled. The GPS signal is sent to the terminal located in the indoor space by a plurality of transmitting antennas based on the controlled transmission time, thereby enabling the terminal located in the indoor space to track its location.

4 Claims, 8 Drawing Sheets

SYSTEM AND METHOD FOR INDOOR LOCATION TRACKING USING PSEUDO GPS SIGNAL TRANSMITTER

CROSS-REFERENCE TO RELATED APPLICATION

This application claims priority to and the benefit of Korean Patent Application No. 10-2010-0097506 and 10-2011-0057661 filed in the Korean Intellectual Property Office on Oct. 6, 2010 and Jun. 14, 2011, the entire contents of which are incorporated herein by reference.

BACKGROUND OF THE INVENTION (a) Field of the Invention

The present invention relates to a system and method for indoor location tracking using a pseudo GPS signal transmitter.

(b) Description of the Related Art

Global positioning systems (GPS) were originally developed for military use, and are widely used in various fields of our daily life. In recent years, the GPS, integrated with a mobile terminal such as a smartphone, has been used for location-based services that create new added values by combining user's location information with peripheral information. Such location-based services are used in various fields, including a call for help, response to reported crimes, a geographical information system for providing information on neighboring regions, traffic information, vehicle positioning, logistics, etc.

Particularly, the location tracking technology using GPS has the merit of getting location information anywhere with a GPS receiver alone without building an infrastructure. However, the location-based services using GPS have been applied mainly for indoor spaces. This is because, for indoor spaces, a GPS signal is severely attenuated through building walls or the like, and this causes difficulties in acquiring the GPS signal in poor propagation environments, thereby making location calculation impossible.

Accordingly, studies of new technologies of location determination in indoor and shielded areas have been carried out. For example, a wireless location determination technology in which a GPS position determination technology is used outdoors and an infrastructure such as WLAN, UWB, and RFID is used indoors may be cited. However, such an indoor wireless location determination technology requires an infrastructure dedicated for wireless communication, and is therefore less economical compared to a GPS system. This causes many difficulties in actually putting this technology into practice and widening the application range.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for indoor location tracking, which enable the tracking of an indoor location by using pseudo GPS location determination technology indoors and in shielded areas where a GPS signal cannot be acquired.

An exemplary embodiment of the present invention provides a system for tracking the location of a terminal in an indoor space.

The system includes: a GPS signal receiving antenna for receiving a GPS signal sent from an artificial satellite; a pseudo GPS signal transmitter including the GPS signal receiving antenna, and for generating a pseudo GPS signal based on the GPS signal received by the GPS signal receiving antenna; and a plurality of GPS transmitting antennas for sending the pseudo GPS signal generated by the pseudo GPS signal transmitter to enable the terminal located in the indoor space to track the location.

Another embodiment of the present invention provides a method for tracking the location of a terminal in an indoor space by using a pseudo GPS signal transmitter.

The method includes: receiving a GPS signal sent from an artificial satellite, and extracting a clock signal of the artificial satellite from the GPS signal to achieve synchronization with the artificial satellite; generating a pseudo GPS signal when the synchronization with the artificial satellite is achieved; controlling the transmission time of the generated pseudo GPS signal; and sending the GPS signal to the terminal located in the indoor space through a plurality of transmitting antennas based on the controlled transmission time.

According to the present invention, location tracking using a GPS receiving terminal is enabled even in an indoor space by the use of a pseudo GPS signal. Moreover, time synchronization of a pseudo GPS signal transmitter is performed by receiving a GPS signal from a satellite, thereby enabling high-precision time synchronization of the transmitter, as compared to the use of a number of indoor pseudo satellites.

Furthermore, by transmitting location information and time information of a transmitting antenna to other antennas by a switching method, the same effect as the installation of a number of pseudo satellites using a single pseudo GPS signal transmitter can be attained. Thus, infrastructure costs can be reduced.

In addition, as a GPS signal of a satellite is received from the outside and relayed to an indoor space, exact location tracking is enabled compared to an indoor location tracking system.

DETAILED DESCRIPTION OF THE EMBODIMENTS

Figure 1:
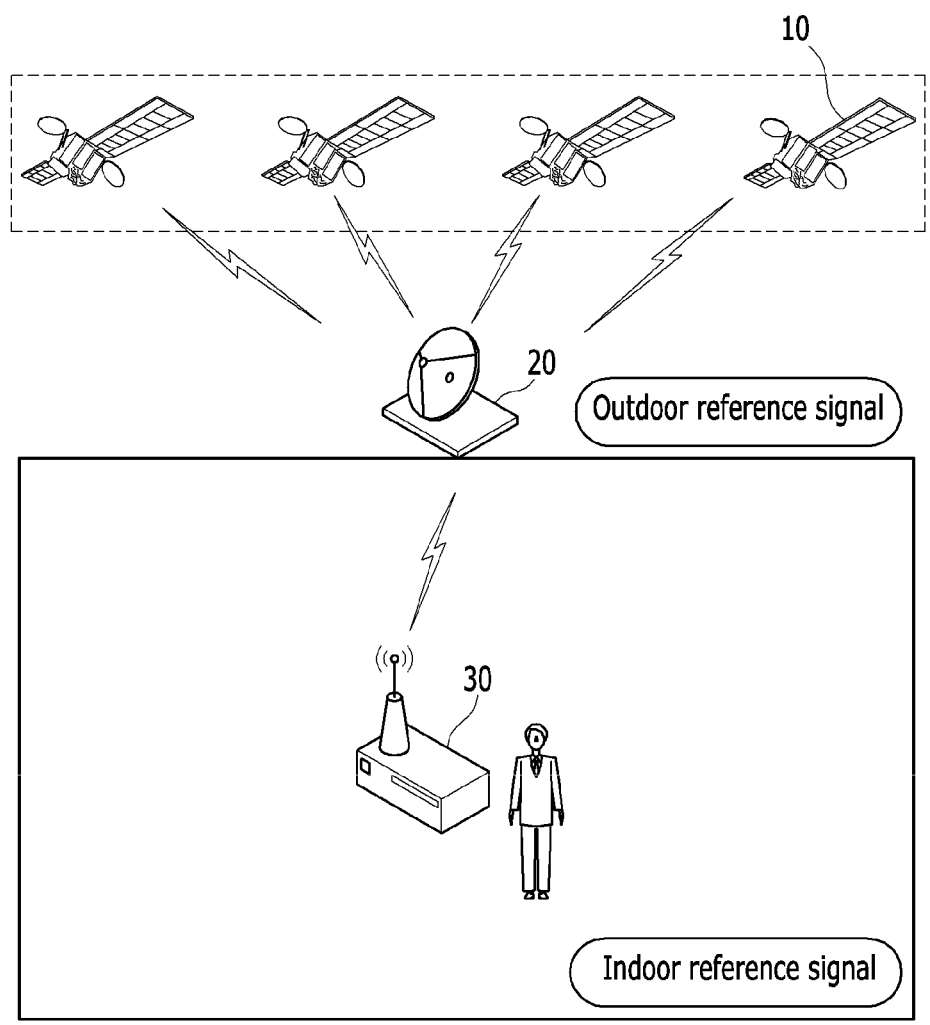
FIG. 1 is an illustration of a general indoor location tracking environment using a GPS signal repeating method.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the words "comprise" and "include" and variations such as "comprises", "includes", "comprising", or "including" will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), and an access terminal (AT), and it may include entire or partial functions of the mobile station, the mobile terminal, the subscriber station, the portable subscriber station, the user equipment, and the access terminal.

In the specification, a base station (BS) may indicate an access point (AP), a radio access station (RAS), a nodeB (Node-B), a base transceiver station (BTS), and a mobile multihop relay (MMR)-BS, and it may include entire or partial functions of the access point, the radio access station, the nodeB, the base transceiver station, and the mobile multihop relay-BS.

Hereinafter, a system and method for tracking an indoor location in real time by using a pseudo GPS signal according to an exemplary embodiment of the present invention will be described with reference to the accompanying drawings. Prior to explaining the exemplary embodiment of the present invention, an example of a typical indoor location tracking environment will be described first with reference to FIGS. 1 and 2.

FIG. 1 is an illustration of a general indoor location tracking environment using a GPS signal repeating method.

As shown in FIG. 1, to provide a location tracking service even in an indoor space by using GPS position determination technology, the indoor location tracking environment for using a GPS signal repeater includes artificial satellites 10, a GPS signal repeater 20, and a GPS receiver terminal 30.

At least one of the plurality of artificial satellites 10 periodically sends time information and navigation data of the satellite. A transmitted GPS signal is received by the GPS signal repeater 20, and the GPS signal repeater 20 amplifies the received GPS signal and transmits it to the GPS receiver terminal 30 through an antenna installed in an indoor space.

The GPS receiver terminal 30 receives the GPS signal transmitted from the GPS signal repeater 20, and collects the time information and navigation data of the artificial satellite 10. Using this information, the coordinates of the GPS receiver terminal 30 are calculated as they are calculated outdoors. To calculate the coordinates, the GPS receiver terminal 30 has to receive satellite signals from four or more artificial satellites.

In this method, GPS signals sent from the artificial satellites are merely amplified and relayed to an indoor space, thus rendering it easy to configure the environment. However, in the case that the GPS receiver terminal 30 calculates its own location using the time information of the artificial satellite 10, a position error may occur because the artificial satellite 10 and the GPS receiver terminal 30 are placed not at a linear distance, but with the GPS signal repeater 20 therebetween.

To make up for this disadvantage, studies have been conducted on a method using a number of pseudo satellites, which will be explained with reference to FIG. 2.

Figure 2:
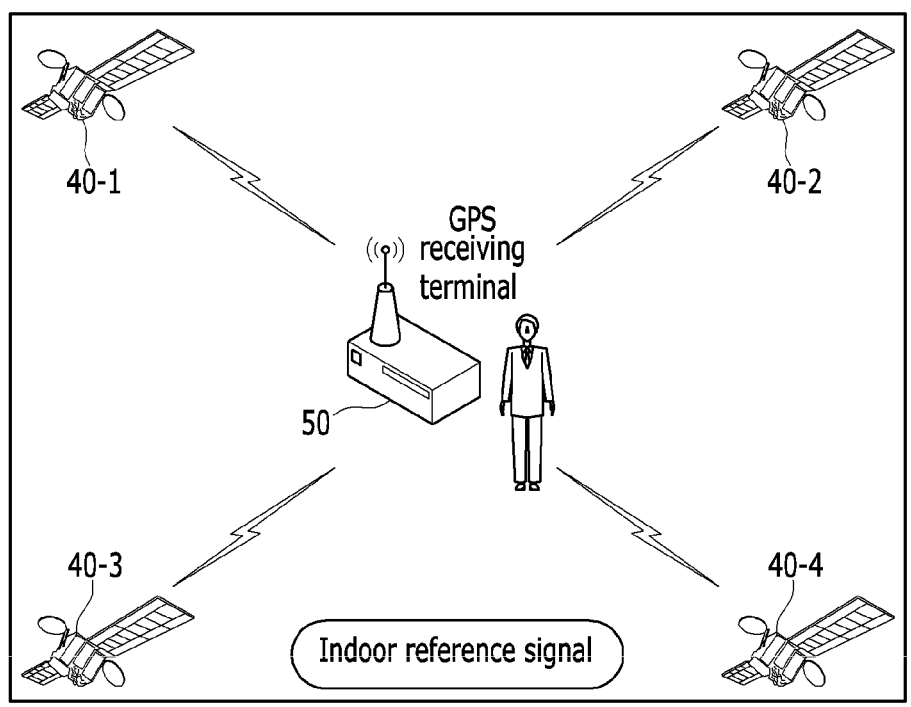
FIG. 2 is an illustration of a general indoor location tracking environment using indoor pseudo satellites.

FIG. 2 is an illustration of a general indoor location tracking environment using indoor pseudo satellites.

As shown in FIG. 2, the location tracking environment using indoor pseudo satellites include a plurality of indoor pseudo satellites 40-1 to 40-4 and a GPS receiver terminal 50.

The pseudo satellites 40-1 to 40-4 generate GPS signals similar to those transmitted from satellites, and sends them to indoor and shielded areas where no satellite signals transmitted from the satellites are received. The similar GPS signals contain location and time information of the pseudo satellites 40-1 to 40-4.

The GPS receiver terminal 50 receives GPS signals from the plurality of pseudo satellites 40-1 to 40-4, and calculates the three-dimensional coordinates of the GPS receiver terminal 50.

When tracking the indoor location of a terminal by using indoor pseudo satellites in this manner, it is necessary to use a number of pseudo satellites. Thus, precise synchronization between the pseudo satellites should be achieved to reduce position errors of the terminal. Therefore, an apparatus for synchronization between the pseudo satellites is required.

Accordingly, the exemplary embodiment of the present invention suggests a system and method for tracking an indoor location in real time by using a pseudo GPS signal transmitter, which will be described hereinbelow with reference to the accompanying drawings.

Figure 3:
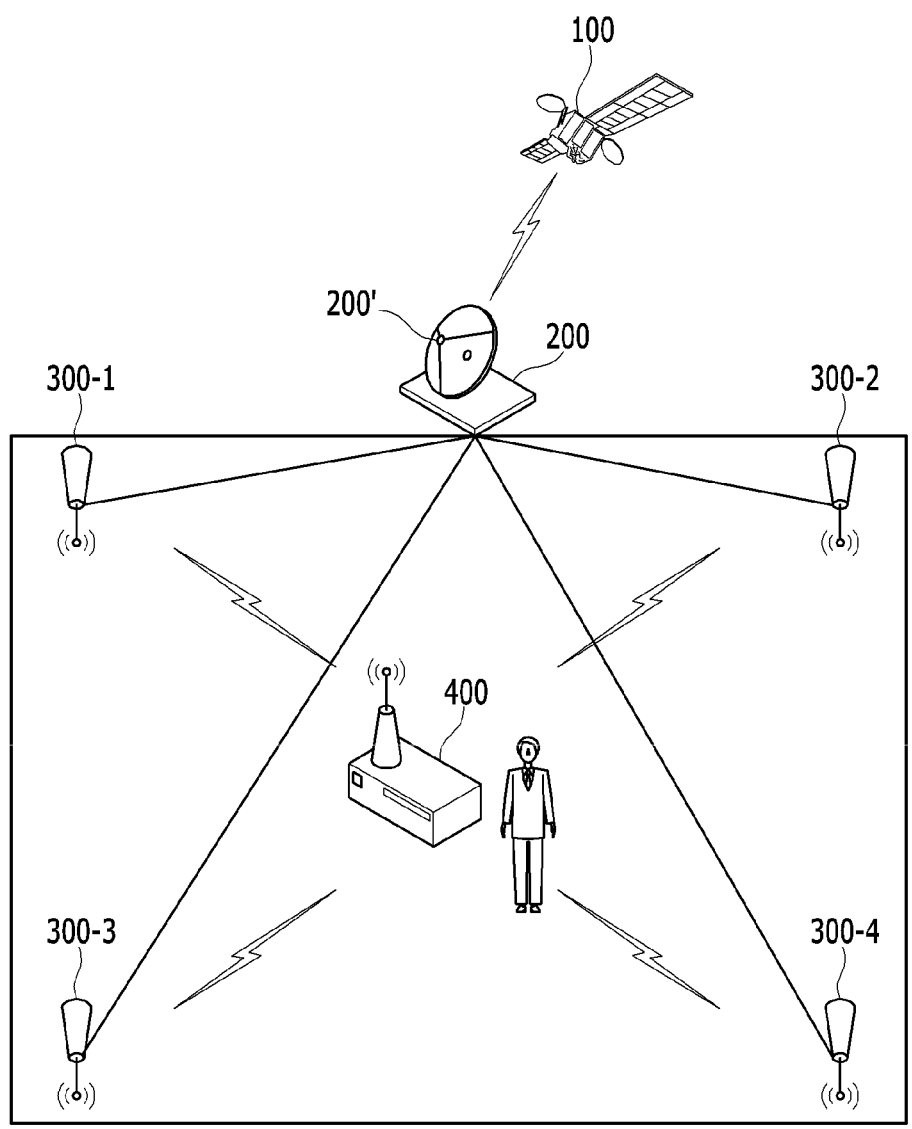
FIG. 3 is an illustration of an indoor location tracking environment using a pseudo GPS signal transmitter according to a first exemplary embodiment of the present invention.

FIG. 3 is an illustration of an indoor location tracking environment using a pseudo GPS signal transmitter according to a first exemplary embodiment of the present invention.

As shown in FIG. 3, the indoor location tracking environment according to the first exemplary embodiment of the present invention includes an artificial satellite 100, a pseudo GPS signal transmitter 200, a plurality of GPS transmitter antennas 300-1 to 300-4, and a terminal 400. Although the exemplary embodiment of the present invention has been described with respect to an example in which four GPS transmitter antennas 300-1 to 300-4 are installed in an indoor space in conjunction with the pseudo GPS transmitter 200, the present invention is not necessarily limited thereto.

The artificial satellite 100 periodically sends a GPS signal containing its time information and navigation data.

The pseudo GPS signal transmitter 200 is installed outdoors, and includes a GPS signal receiving antenna. When the GPS signal receiving antenna receives the GPS signal sent from the artificial satellite 100, it relays the GPS signal to the pseudo GPs signal transmitter 200. The pseudo GPS signal transmitter 200 is installed outdoors so that it can properly receive the GPS signal from the artificial satellite 100.

Also, the pseudo GPS signal transmitter 200 extracts a clock signal from the received GPS signal, and synchronizes a clock of the pseudo GPS signal transmitter 200 with the clock signal of the artificial satellite 100. This enables precise time synchronization between the pseudo GPS signal transmitter 200 and the artificial satellite 100.

Moreover, the pseudo GPS signal transmitter 200 generates a pseudo GPS signal similar to the GPS signal and sends it. The pseudo GPS signal includes identification information of the GPS transmitter antennas 300-1 to 300-4, information on the locations where the GPS transmitter antennas 300-1 to 300-4 are installed, and transmission time information of the pseudo GPS signal transmitter 200. At this point, the pseudo GPS signal transmitter 200 sends one pseudo GPS signal for each of the plurality of GPS transmitter antennas 300-1 to 300-4 by a switching method.

The GPS transmitter antennas 300-1 to 300-4 receive the pseudo GPS signals sent from the pseudo GPS signal transmitter 200 and transmit them. Having received the pseudo GPS signals transmitted from the GPS transmitter antennas 300-1 to 300-4, the terminal 400 calculates the current location of the terminal 400 based on the pseudo GPS signals sent from the different antennas. The method for the terminal 400 to receive a plurality of pseudo GPS signals and calculate the location is already known, so a detailed description thereof will be omitted in an exemplary embodiment of the present invention.

The structure of the pseudo GPS signal transmitter 200 can be realized in two configurations depending on the structure of a pseudo GPS signal transmitting unit to be described hereinafter. The first configuration will be described with reference to FIG. 4, and the second configuration will be described with reference to FIG. 6 and subsequent figures. First, the structure of the pseudo GPS signal transmitter according to the first exemplary embodiment will be described.

Figure 4:
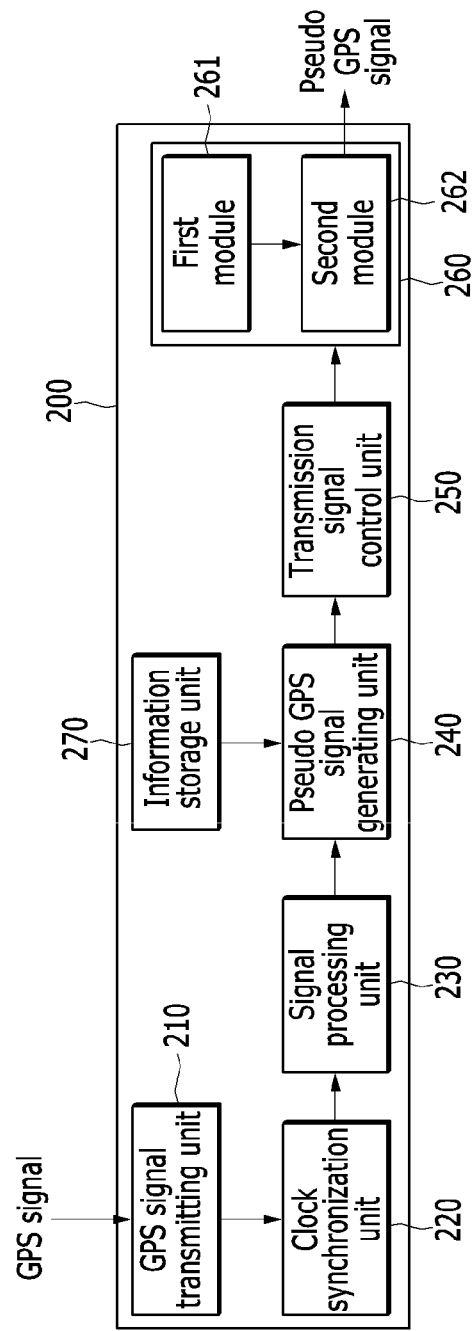
FIG. 4 is a view showing the structure of the pseudo GPS signal transmitter according to the first exemplary embodiment of the present invention.

FIG. 4 is a view showing the structure of the pseudo GPS signal transmitter according to the first exemplary embodiment of the present invention.

As shown in FIG. 4, the pseudo GPS signal transmitter 200 includes a GPS signal receiving unit 210, a clock synchronization unit 220, a signal processing unit 230, a pseudo GPS signal generating unit 240, a transmission signal control unit 250, a pseudo GPS signal transmitting unit 260, and an information storage unit 270.

The GPS signal receiving unit 210 receives a GPS signal sent from the artificial satellite 100, and extracts a clock signal of the artificial satellite 100 and outputs it as a reference GPS signal. The method of extracting a clock signal from a GPS signal is already known, so a detailed description thereof will be omitted in an exemplary embodiment of the present invention.

The clock synchronization unit 220 receives the clock signal of the artificial satellite 100 extracted by the GPS signal receiving unit 210, and performs synchronization of the pseudo GPS signal transmitter 200 based on this clock signal.

The signal processing unit 230 generates a transmission frame to be transmitted to the plurality of GPS transmitter antennas 300-1 to 300-4. The frame contains transmitting antenna identifier information for allowing the terminal 400 to distinguish between signals, transmission time information, location information of the transmitter antennas, and so on.

The pseudo GPS signal generating unit 240 generates a pseudo GPS signal similar to the GPS signal sent from the artificial satellite 100. The pseudo GPS signal contains identifier information of the GPS transmitter antennas 300-1 to 300-4, location information of the GPS transmitter antennas 300-1 to 300-4, and time information on when the pseudo GPS signal transmitter 200 will send the pseudo GPS signal.

To this end, the identifier and location information of the GPS transmitter antennas 300-1 to 300-4 are pre-stored in advance in the information storage unit 270 of the pseudo GPS signal transmitter 200. The method for the pseudo GPS signal generating unit 240 to generate a pseudo GPS signal similar to a GPS signal is already known, so a detailed description thereof will be omitted in an exemplary embodiment of the present invention.

The transmission signal control unit 250 controls the sequence and interval of pseudo GPS signals to be transmitted to the terminal 400, the pseudo GPS signals being generated by the pseudo GPS signal generating unit 240. The transmission signal control unit 250 performs the control operation by taking into account the propagation delay on wires between the pseudo GPS signal transmitter 200 and the GPS transmitter antennas 300-1 to 300-4.

Next, the pseudo GPS signal transmitting unit 260 superimposes the pseudo GPS signal generated by the pseudo GPS signal generating unit 240 on a carrier frequency, and transmits it to the GPS transmitter antennas 300-1 to 300-4. In this case, it is assumed that the pseudo GPS signal transmitting unit 260 and the GPS transmitter antennas 300-1 to 300-4 are connected by wires, and hence the length of the route connected by the wires and the resulting propagation delay are already known.

The pseudo GPS signal transmitting unit 260 includes a first module 261 and a second module 262. In an exemplary embodiment of the present invention, the first module 261 is a baseband module and the second module 262 is an RF module.

In other words, the first module 261 generates a pseudo GPS signal of a baseband signal (hereinafter referred to as an "indoor GPS signal") to be transmitted to the terminal 400 under the control of the transmission signal control unit 250 and the signal processing unit 230, and it corresponds to a digital block. The second module 262 serves to superimpose the indoor GPS signal on a carrier frequency to re-generate a pseudo GPS signal and then transmit it to the transmitter antennas. The second module 262 corresponds to an RF block.

In this way, the pseudo GPS signal transmitting unit 260 includes two modules 261 and 262 because a digital signal to be relayed by wires by a wired connection between the pseudo GPS signal transmitting unit 260 and the transmitter antennas exists, and an RF signal is required for actual transmission to the terminal 400.

The method for the above-described pseudo GPS signal transmitter 200 to track the location of a terminal located in an indoor space will be described with reference to FIG. 5.

Figure 5:
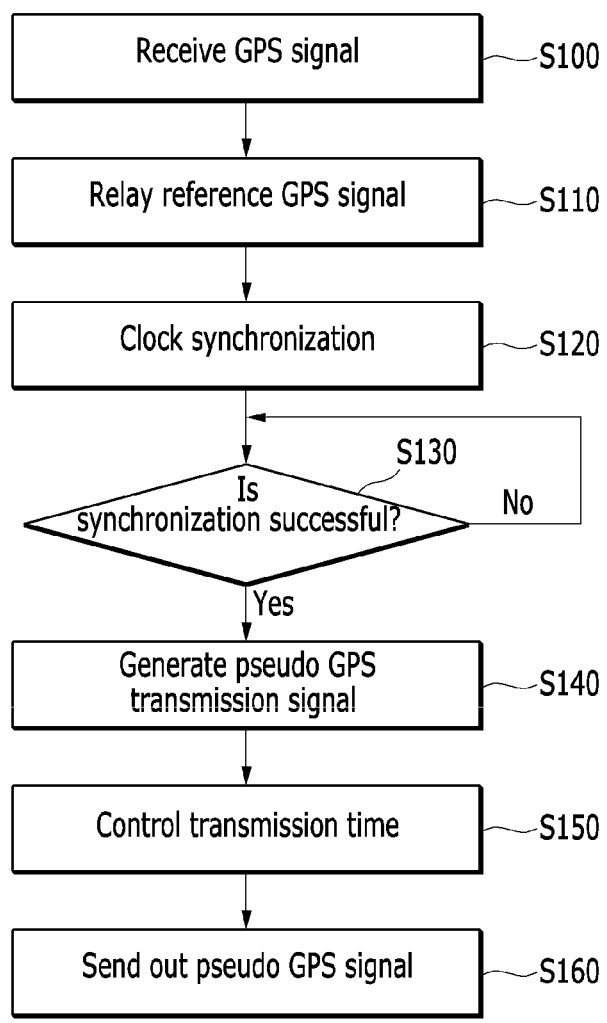
FIG. 5 is a flowchart showing a method for indoor location tracking using the pseudo GPS signal transmitter according to the first exemplary embodiment of the present invention.

FIG. 5 is a flowchart showing a method for indoor location tracking using the pseudo GPS signal transmitter according to the first exemplary embodiment of the present invention.

As shown in FIG. 5, when the antenna of the pseudo GPS signal transmitter 200 receives a GPS signal sent from the artificial satellite 100 (S100), the GPS signal is delivered as the reference GPS signal to the GPS signal receiving unit 210 (S110). Next, the GPS signal receiving unit 210 extracts a clock signal of the artificial satellite 100 from the received GPS signal, and the clock synchronization unit 220 synchronizes a clock of the pseudo GPS signal transmitter 200 with the clock signal extracted by the GPS signal receiving unit 210 (S120).

The clock synchronization unit 220 determines whether the synchronization in the step S120 is successful or not (S130). The determination of success or failure of the synchronization is already known, so a detailed description thereof will be omitted in an exemplary embodiment of the present invention. As a result of the determination in the step S130, if the synchronization has failed, the step S130 is repeated until the synchronization succeeds.

Otherwise, if the synchronization is successful, the pseudo GPS signal generating unit 240 generates a pseudo GPS signal similar to the GPS signal (S140). The pseudo GPS signal contains identifier information of the plurality of GPS transmitter antennas 300-1 to 300-4, location information of the GPS transmitter antennas 300-1 to 300-4, and transmission time information on when the pseudo GPS signal is to be transmitted.

In the step S140, when the pseudo GPS signal generating unit 240 generates a pseudo GPS signal, the transmission signal control unit 250 controls transmission time (S150). Transmission time is controlled because the pseudo GPS signal transmitter 200 and the GPS transmitter antennas 300-1 to 300-4 are connected by wires and there is a propagation delay on the wires (S150).

Using the controlled transmission time, the pseudo GPS signal transmitter 200 transmits the pseudo GPS signal to each of the GPS transmitter antennas 300-1 to 300-4 (S160). Prior to transmitting the pseudo GPS signal, when the first module 261 generates a baseband pseudo GPS signal, the second module 262 superimposes the baseband signal on a carrier frequency to generate an RF signal and then transmits it. Having received the pseudo GPS signal, each of the plurality of GPS transmitter antennas 300-1 to 300-4 sends the received pseudo GPS signal so that the terminal 400 located in an indoor space can perform location tracking by using the pseudo GPS signal.

Meanwhile, an indoor location tracking environment according to a second exemplary embodiment in which only a digital block is included in the pseudo GPS signal transmitting part, unlike the first exemplary embodiment, will be described with reference to FIG. 6.

Figure 6:
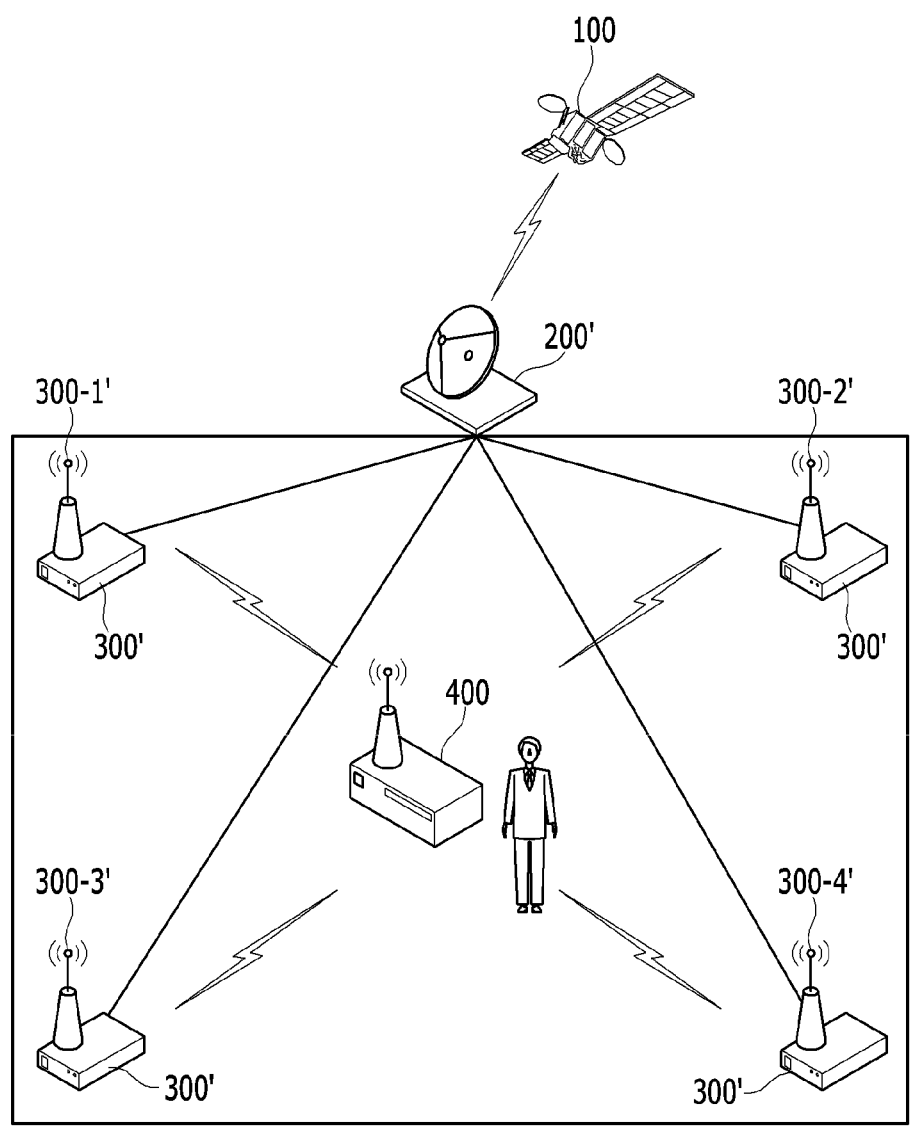
FIG. 6 is an illustration of an indoor location tracking environment using a pseudo GPS signal transmitter according to a second exemplary embodiment of the present invention.

FIG. 6 is an illustration of an indoor location tracking environment using a pseudo GPS signal transmitter according to a second exemplary embodiment of the present invention.

As shown in FIG. 6, the indoor location tracking environment according to the exemplary embodiment of the present invention includes an artificial satellite 100, a pseudo GPS signal transmitter 200', a plurality of indoor GPS transmitters 300' having GPS transmitter antennas 300-1' to 300-4', and a terminal 400.

Although the exemplary embodiment of the present invention has been described with respect to an example in which four indoor GPS transmitters 300' are installed in an indoor space in conjunction with the pseudo GPS transmitter 200', the present invention is not necessarily limited thereto. The indoor GPS transmitters 300' have the GPS transmitter antennas 300-1' to 300'4', respectively, and are designated with reference numeral 300' for better comprehension and ease of description.

The artificial satellite 100 periodically sends a GPS signal containing its time information and navigation data.

The pseudo GPS signal transmitter 200' is installed outdoors, and includes a GPS signal receiving antenna. When the GPS signal receiving antenna receives the GPS signal sent from the artificial satellite 100, it delivers the GPS signal to the pseudo GPs signal transmitter 200'. The pseudo GPS signal transmitter 200' is installed outdoors so that it can properly receive the GPS signal from the artificial satellite 100.

Also, the pseudo GPS signal transmitter 200' extracts a clock signal from the received GPS signal, and synchronizes a clock of the pseudo GPS signal transmitter 200' with the clock signal of the artificial satellite 100. This enables precise time synchronization between the pseudo GPS signal transmitter 200' and the artificial satellite 100.

Moreover, the pseudo GPS signal transmitter 200' generates a pseudo GPS signal similar to the GPS signal, and generates an indoor GPS signal of an RF signal from the pseudo GPS signal and sends it to the indoor GPS transmitters 300'. Although the indoor GPS signal is identical to a pseudo GPS signal, which includes identification information of the GPS transmitter antennas 300-1' to 300-4', information on the locations where the GPS transmitter antennas 300-1' to 300-4' are installed, and transmission time information of the pseudo GPS signal transmitter 200, this signal is in the form of a baseband signal. At this point, the pseudo GPS signal transmitter 200' sends one indoor GPS signal for each of the indoor GPS transmitters 300' having the GPS transmitter antennas 300-1' to 300-4' by a switching method.

The plurality of indoor GPS transmitters 300' respectively having the plurality of GPS transmitter antennas 300-1' to 300-4' convert the indoor GPS signal of a baseband into an RF signal to regenerate a pseudo GPS signal. The GPS transmitter antennas 300-1' to 300-4' transmit the pseudo GPS signals, respectively. Having received the pseudo GPS signals transmitted from the GPS transmitter antennas 300-1' to 300-4', the terminal 400 calculates the current location of the terminal 400 based on the pseudo GPS signals sent from the different antennas.

Figure 7:
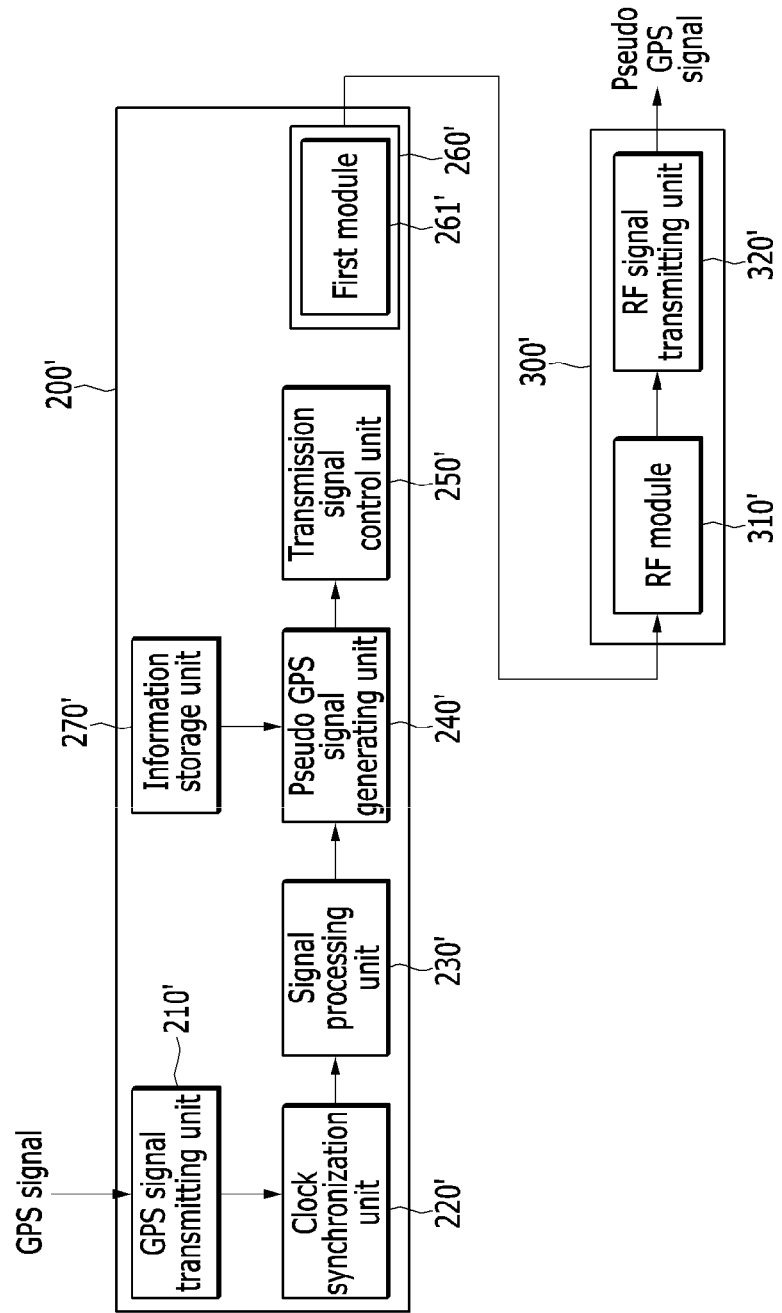
FIG. 7 is a view showing the structure of the pseudo GPS signal transmitter according to the second exemplary embodiment of the present invention.

FIG. 7 is a view showing the structure of the pseudo GPS signal transmitter according to the second exemplary embodiment of the present invention.

As shown in FIG. 7, the pseudo GPS signal transmitter 200' includes a GPS signal receiving unit 210', a clock synchronization unit 220', a signal processing unit 230', a pseudo GPS signal generating unit 240', a transmission signal control unit 250', a pseudo GPS signal transmitting unit 260', and an information storage unit 270'.

The GPS signal receiving unit 210' receives a GPS signal sent from the artificial satellite 100, and extracts a clock signal of the artificial satellite 100 and outputs it as a reference GPS signal. The method of extracting a clock signal from a GPS signal is already known, so a detailed description thereof will be omitted in an exemplary embodiment of the present invention.

The clock synchronization unit 220' receives the clock signal of the artificial satellite 100 extracted by the GPS signal receiving unit 210', and performs synchronization of the pseudo GPS signal transmitter 200' based on this clock signal.

The signal processing unit 230' generates a transmission frame to be transmitted to the plurality of GPS transmitter antenna 300-1' to 300-4'. The frame contains transmitting antenna identifier information for allowing the terminal 400 to distinguish between signals, transmission time information, location information of the transmitter antennas, and so on.

The pseudo GPS signal generating unit 240' generates a pseudo GPS signal similar to the GPS signal sent from the artificial satellite 100. The pseudo GPS signal contains identifier information of the GPS transmitter antennas 300-1' to 300-4', location information of the GPS transmitter antennas 300-1' to 300-4', and time information when the pseudo GPS signal transmitter 200' will send the pseudo GPS signal.

To this end, the identifier and location information of the GPS transmitter antennas 300-1' to 300-4' are pre-stored in advance in the information storage unit 270' of the pseudo GPS signal transmitter 200'. The method for the pseudo GPS signal generating unit 240' to generate a pseudo GPS signal similar to a GPS signal is already known, so a detailed description thereof will be omitted in an exemplary embodiment of the present invention.

The transmission signal control unit 250' controls the sequence and interval of pseudo GPS signals to be transmitted to the terminal 400, the pseudo GPS signals generated by the pseudo GPS signal generating unit 240'. The transmission signal control unit 250' performs the control operation by taking into account the propagation delay on wires between the pseudo GPS signal transmitter 200' and the GPS transmitter antennas 300-1' to 300-4' of the indoor GPS transmitters 300'.

Next, the pseudo GPS signal transmitting unit 260' converts the pseudo GPS signal generated by the pseudo GPS signal generating unit 240' into an indoor GPS signal, and transmits it to the indoor GPS transmitters 300'. In this case, it is assumed that the pseudo GPS signal transmitting unit 260' and the GPS transmitter antennas 300-1' to 300-4' are connected by wires, and hence the length of the route connected by the wires and the resulting propagation delay are already known.

The pseudo GPS signal transmitting unit 260' includes a first module 261' and an RF signal transmitting unit 320'. In an exemplary embodiment of the present invention, the first module 261' is a baseband module. In other words, the first module 261' generates an indoor GPS signal, a pseudo GPS signal of a baseband to be transmitted to the terminal 400, under the control of the transmission signal control unit 250' and the signal processing unit 230', and it corresponds to a digital block.

In this way, unlike the pseudo GPS signal transmitter 200 according to the first exemplary embodiment shown in FIG. 4, the pseudo GPS signal transmitter 200' according to the second exemplary embodiment generates an indoor GPS signal, a baseband signal, and delivers it to the indoor GPS transmitters 300' over the wires. This is because, when delivering the pseudo GPS signal to the antennas on the wires, a digital signal is more resistant to attenuation and signal distortion than an RF signal.

Accordingly, in order to receive the indoor GPS signal delivered from the pseudo GPS signal transmitter 200' according to the second exemplary embodiment of the present invention and provide it as a pseudo GPS signal to the terminal 400, each of the plurality of indoor GPS transmitters 300' includes an RF block 310' and an RF signal transmitting unit 320' as shown in FIG. 7.

When the RF block 310' generates a pseudo GPS signal of an RF signal by superimposing the indoor GPS signal of the baseband signal transmitted from the pseudo GPS signal transmitter 200' on a carrier frequency, the RF signal transmitting unit 320' delivers the pseudo GPS signal of the RF signal to the GPS transmitter antennas 300-1' to 300-4' and transmits it to the terminal 400.

The method for the above-described pseudo GPS signal transmitter 200' to track the location of a terminal located in an indoor space will be described with reference to FIG. 8.

Figure 8:
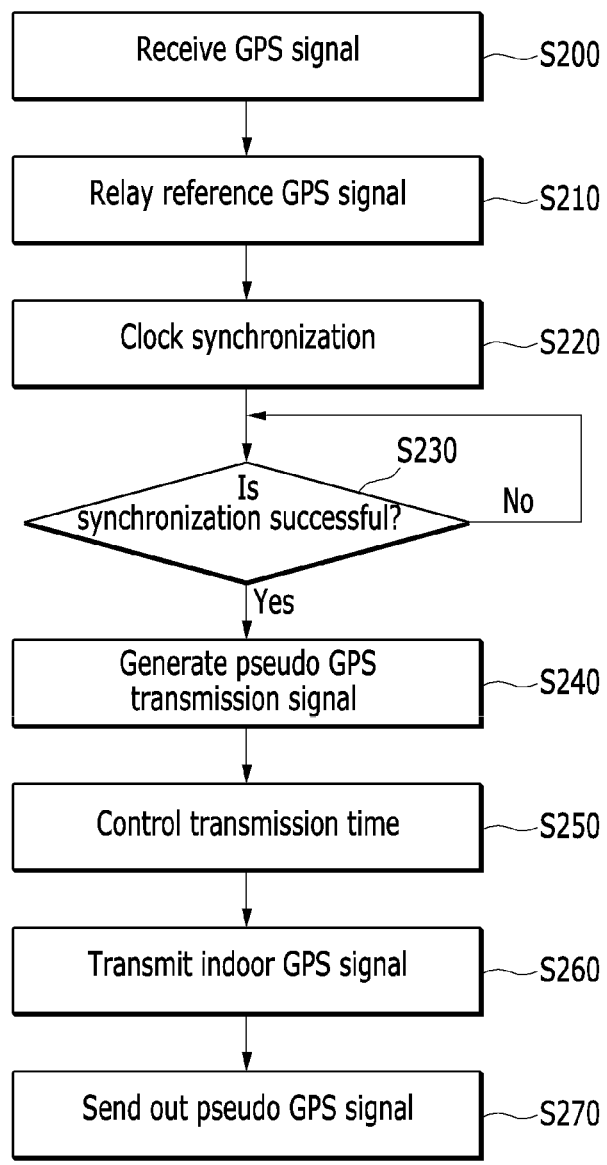
FIG. 8 is an illustration of an indoor location tracking environment using the pseudo GPS signal transmitter according to the second exemplary embodiment of the present invention.

FIG. 8 is an illustration of a method for indoor location tracking using the pseudo GPS signal transmitter according to the second exemplary embodiment of the present invention.

As shown in FIG. 8, when the antenna of the pseudo GPS signal transmitter 200' receives a GPS signal sent from the artificial satellite 100 (S200), the GPS signal is delivered as the reference GPS signal to the GPS signal receiving unit 210' (S210). Next, the GPS signal receiving unit 210' extracts a clock signal of the artificial satellite 100 from the received GPS signal, and the clock synchronization unit 220' synchronizes a clock of the pseudo GPS signal transmitter 200' with the clock signal extracted by the GPS signal receiving unit 210' (S220).

The clock synchronization unit 220' determines whether the synchronization in the step S220 is successful or not (S230). The determination of success or failure of the synchronization is already known, so a detailed description thereof will be omitted in an exemplary embodiment of the present invention. As a result of the determination in the step S230, if the synchronization has failed, the step S230 is repeated until the synchronization succeeds.

Otherwise, if the synchronization is successful, the pseudo GPS signal generating unit 240' generates an indoor GPS signal to be transmitted to the indoor GPS transmitter 300' (S240). The pseudo GPS signal contains identifier information of the plurality of GPS transmitter antennas 300-1' to 300-4', location information of the GPS transmitter antennas 300-1' to 300-4', and transmission time information on when the pseudo GPS signal is to be transmitted. The indoor GPS signal generated in the step S240 is in a digital form.

In the step S240, when the pseudo GPS signal generating unit 240' generates an indoor pseudo GPS signal, the transmission signal control unit 250' controls transmission time (S250). Transmission time is controlled because the pseudo GPS signal transmitter 200' and the GPS transmitter antennas 300-1' to 300-4' of the indoor GPS transmitters 300' are connected by wires and there is a propagation delay on the wires (S250).

Using the controlled transmission time, the pseudo GPS signal transmitter 200' transmits the indoor pseudo GPS signal to each of the indoor GPS transmitters 300' (S260). In other words, the first module 261' digitizes the pseudo GPS signal—that is, converts the pseudo GPS signal into a baseband signal—to generate an indoor GPS signal, and transmits it into the plurality of indoor GPS transmitters 300'.

Having received the indoor GPS signal, the RF module 310' of each of the indoor GPS transmitters 300' superimposes the indoor GPS signal of the baseband on a carrier frequency to regenerate a pseudo GPS signal and deliver it. Next, having received the pseudo GPS signal, the RF signal transmitting unit 320' delivers the pseudo GPS signal to each of the GPS transmitter antennas 300-1' to 300-4' so that the received pseudo GPS signal is sent out to allow the terminal 400 located in the indoor space to track location by using the pseudo GPS signal (S270).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for tracking the location of a terminal in an indoor space, the system comprising:

a GPS signal receiving antenna for receiving a GPS signal sent from an artificial satellite;

a pseudo GPS signal transmitter including the GPS signal receiving antenna, and for generating a pseudo GPS signal based on the GPS signal received by the GPS signal receiving antenna; and a plurality of GPS transmitting antennas for sending the pseudo GPS signal generated by the pseudo GPS signal transmitter to enable the terminal located in the indoor space to track the location, wherein the pseudo GPS signal transmitter comprises:

a GPS signal receiving unit that receives the GPS signal received by the GPS signal receiving antenna, extracts a clock signal of the artificial satellite contained in the GPS signal, and outputs the extracted clock signal as a reference GPS signal;

a clock synchronization unit that performs clock synchronization with the artificial satellite based on the reference GPS signal output from the GPS signal receiving part;

a pseudo GPS signal generating unit that contains identification information of the GPS transmitting antennas, location information of the GPS transmitting antennas, and pseudo GPS signal transmission time information, and generates a pseudo GPS signal; and a signal transmitter that relays the pseudo GPS signal generated by the pseudo GPS signal generating unit to send the same out wherein the pseudo GPS signal transmitter further comprises:

a transmission signal control unit that controls the sequence and interval of the pseudo GPS signal to be sent;

a signal processing unit that generates a transmission frame to be sent to the GPS transmitting antennas; and an information storage unit that stores identification information of the GPS transmitting antennas and location information of the GPS transmitting antennas.

2. The system of claim 1, wherein the signal transmitting unit further comprises a first module that controls the transmission signal control unit and the signal processing part, and generates and outputs the pseudo GPS signal generated by the pseudo GPS signal generating unit as an indoor GPS signal of a baseband signal.

3. The system of claim 2, wherein the signal transmitting unit further comprises:

a second module that regenerates a pseudo GPS signal of an RF signal by superimposing the indoor GPS signal generated by the first module on a carrier frequency.

4. The system of claim 3, wherein the indoor GPS transmitter comprising the GPS transmitting antenna comprises:

an RF module that receives the indoor GPS signal output from the first module, and superimposes the indoor GPS signal on a carrier frequency to regenerate a pseudo GPS signal of an RF signal; and an RF signal transmitting unit that delivers the regenerated pseudo GPS signal to the GPS transmitting antennas.

* * * * *